March 13, 1945.
N. MANGINI
2,371,537
SPOON HOLDER
Filed June 22, 1944
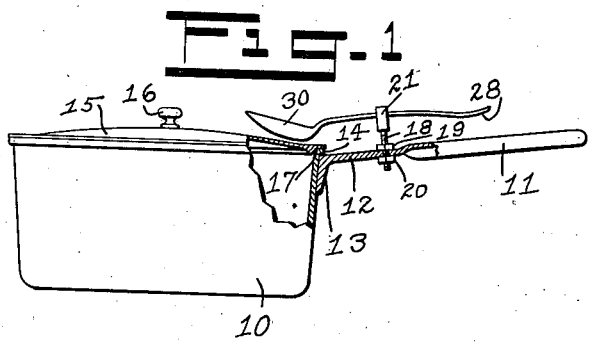
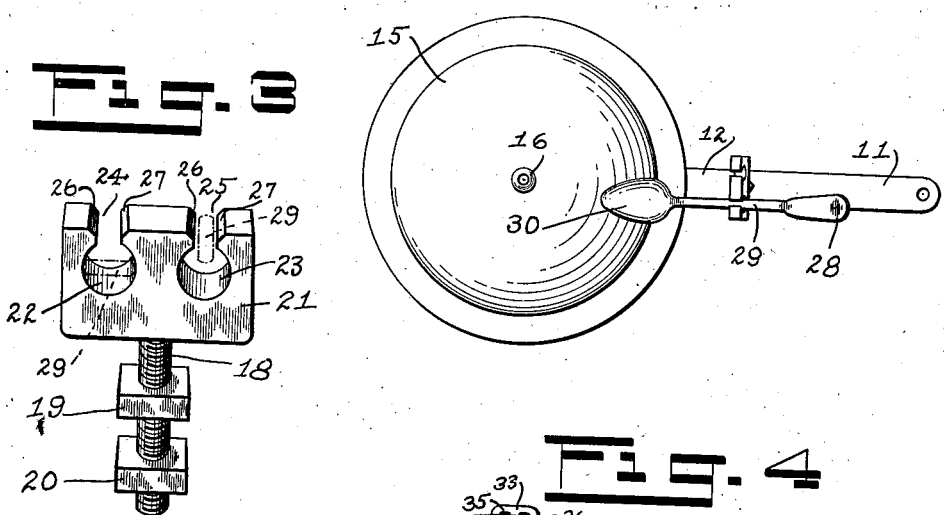
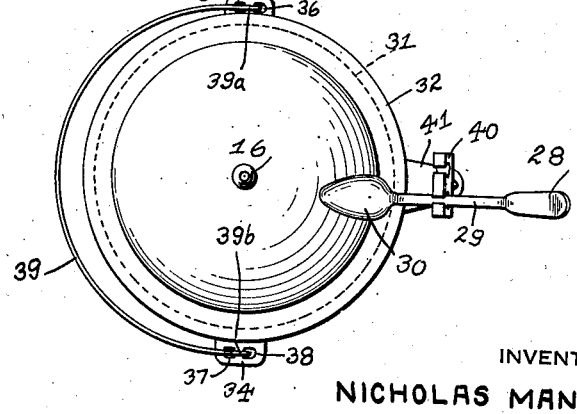
INVENTOR
NICHOLAS MANGINI
BY
*H. G. Manning*
ATTORNEY Patented Mar. 13, 1945

2,371,537

UNITED STATES PATENT OFFICE 2,371,537

SPOON HOLDER

Nicholas Mangini, Waterbury, Conn.

Application June 22, 1944, Serial No. 541,622

1 Claim. (Cl. 65—65)

This invention relates to cooking utensils, and more particularly to a spoon holder to be attached to the side of a cooking pan for suspending the spoon in raised position with the bowl of the spoon above the pan cover.

One object of the present invention is to provide a device of the above nature which may be quickly and easily attached to and detached from the cooking pan, and which will hold the spoon with its handle located outside the pan in convenient position to be easily grasped by the user whenever desired.

A further object is to provide a device of the above nature which will be simple in construction, inexpensive to manufacture, easy to install and manipulate, compact, ornamental in appearance, and very efficient and durable in use.

With these and other objects in view, there have been illustrated in the accompanying drawing two forms in which the invention may conveniently be embodied in practice.

In the drawing,

Fig. 1 represents a side view, partly in section, of the first form of the invention showing the spoon-holding bracket attached to the handle of a sauce pan and with the spoon extending inwardly above the cover thereof.

Fig. 2 is a top plan view of the same.

Fig. 3 is a perspective view of the spoon-holding bracket, shown in detached position.

Fig. 4 is a top plan view of a modified form of the invention in which the spoon-holding bracket is attached to an angular side lug which is rigidly secured to the body of a different type of cooking pan.

Referring now to the drawing in which like reference numerals denote corresponding parts throughout the several views, the numeral 10 indicates the body of a sauce pan having an elongated rounded handle 11, said handle having a flat inner section 12 and a depending section 13 rigidly secured to the outside of the pan at the top thereof. The numeral 14 indicates a short outstanding rim located at the top portion of the pan 10 which is adapted to be protected by a cover 15 having at its center a manipulating knob 16. The cover 15 is provided on its under surface with an annular shoulder 17 shaped to fit over the rim 14.

In order to support the spoon in substantially horizontal position above the handle 11 and the cover 15 of the pan 10, provision is made of a screw rod 18 which is adapted to be held in substantially vertical position by a pair of nuts 19, 20 located above and below said handle, said screw rod passing through an aperture formed in the flat inner section 12 of the handle 11.

The screw rod is connected to a rectangular top bracket 21 having a pair of cylindrical recesses 22, 23, each of said recesses having a slot 24, 25 in its upper end, which slots are provided with bevelled side edges 26, 27 to facilitate the insertion of the shank 29 of a spoon 28 when said shank is held in a vertical plane as shown by the dotted lines in the right hand recess 23 of Fig. 3. The shank 29 may then be twisted 90 degrees into a horizontal plane, as indicated by the dotted lines in the left hand recess 22 of Fig. 3. By means of this construction the bowl 30 of the spoon 28 will be held in operating position, spaced above the underlying cover 15, as shown in Fig. 1, and with the handle located outside the sauce pan 10, where it will be relatively cool.

Operation

In operation, the spoon-holding bracket 21 will first be attached by the screw rod 18 and nuts 19 and 20 to the handle section 12. The shank 29 of the spoon 28 will be held in a vertical plane and inserted into the slot in the edge of the holder, and then passed downwardly therethrough into the recess. It will then be twisted 90 degrees to bring the spoon into the position shown in Fig. 1. In this position, the handle of the spoon 28 will be kept outside the sauce pan in a cool condition, and the spoon will be accessible for use whenever desired.

Modified form

In the modified form of the invention shown in Fig. 4, the numeral 31 indicates a cooking pan provided with a detachable cover 32. The pan 31 has a pair of opposed lateral ears 33, 34, provided with eyes 35, 36 and 37, 38, respectively. The pan 31 is adapted to be lifted whenever desired by means of a bail 39 of semi-circular shape, each end of the bail having end loops 39a, 39b which are adapted to pass through the eyes 35, 36 and 37, 38, as clearly shown in Fig. 4.

A spoon-holding bracket 40 similar to the bracket 21 of the first form of the invention is adapted to be secured to an angle lug 41, preferably welded to the cooking pan, by a screw rod and nuts, similar to the parts 18, 19 and 20.

While there have been disclosed in this specification two forms in which the invention may be embodied, it is to be understood that these forms are shown for the purpose of illustration only and that the invention is not to be limited to the specific disclosures, but may be modified and embodied in various other forms without departing from its spirit. In short, the invention includes all the modifications and embodiments coming within the scope of the following claim.

Having thus fully described the invention, what is claimed as new and for which it is desired to secure Letters Patent is:

In a device for holding a spoon in raised position above a cooking pan provided with a laterally extending handle, a screw rod passing vertically through said handle, nuts on said screw rod to engage the upper and lower sides of said handle to clamp said rod detachably in position on said handle, a horizontal solid bracket bar connected to the upper end of said screw rod and having a vertical slot with an enlarged depending cylindrical recess in its upper surface to detachably receive and hold a spoon when not in use.

NICHOLAS MANGINI.